United States Patent [19]
Berry et al.

[11] 3,816,048
[45] June 11, 1974

[54] SNOW MOLD

[76] Inventors: Robert H. Berry, 1905 Cherokee;
John W. Smith, 844 Navajo, both of Carpentersville, Ill. 60110

[22] Filed: June 5, 1972

[21] Appl. No.: 259,555

[52] U.S. Cl............ 425/318, 425/DIG. 57, 249/66, 249/160
[51] Int. Cl............................................... B29c 1/00
[58] Field of Search........... 249/66, 74, 160, 76, 77, 249/170, 117, 141; 425/318, DIG. 57, 276, 126

[56] References Cited
UNITED STATES PATENTS

| | | | |
|---|---|---|---|
| 2,460,697 | 2/1949 | Kreger | 249/66 |
| 2,752,631 | 7/1956 | Wendt | 425/181 |
| 2,819,510 | 1/1958 | Vom Norden | 425/DIG. 57 |
| 3,717,431 | 2/1973 | Matsuda | 425/318 |

FOREIGN PATENTS OR APPLICATIONS

| 130,366 | 11/1948 | Australia | 249/66 |
|---|---|---|---|

*Primary Examiner*—J. Howard Flint, Jr.
*Attorney, Agent, or Firm*—Lockwood, Dewey, Zickert & Alex

[57] ABSTRACT

A two-piece mold for producing shaped units of formable material such as snow and the like, and for handling and positioning the shaped units. One piece of the mold provides three sides and at least one open end, and the second piece provides the fourth side and an end closure. The two mold pieces are slidably mated along their edges to an assembled condition in which the first and second pieces are secured to provide an open topped, closed bottom mold. After snow or other shape-holding material is packed into the mold through the open top, and sets its shape, the filled mold is inverted. With the second piece held in place, the three-sided element is drawn past the fixed end closure which is now positioned at the top until the three-sided element is separated. The second element including the end closure is moved laterally from the resulting block of shaped material to leave the shaped unit standing free where initially positioned. The first and second elements of the mold can then be mated for reuse.

6 Claims, 7 Drawing Figures

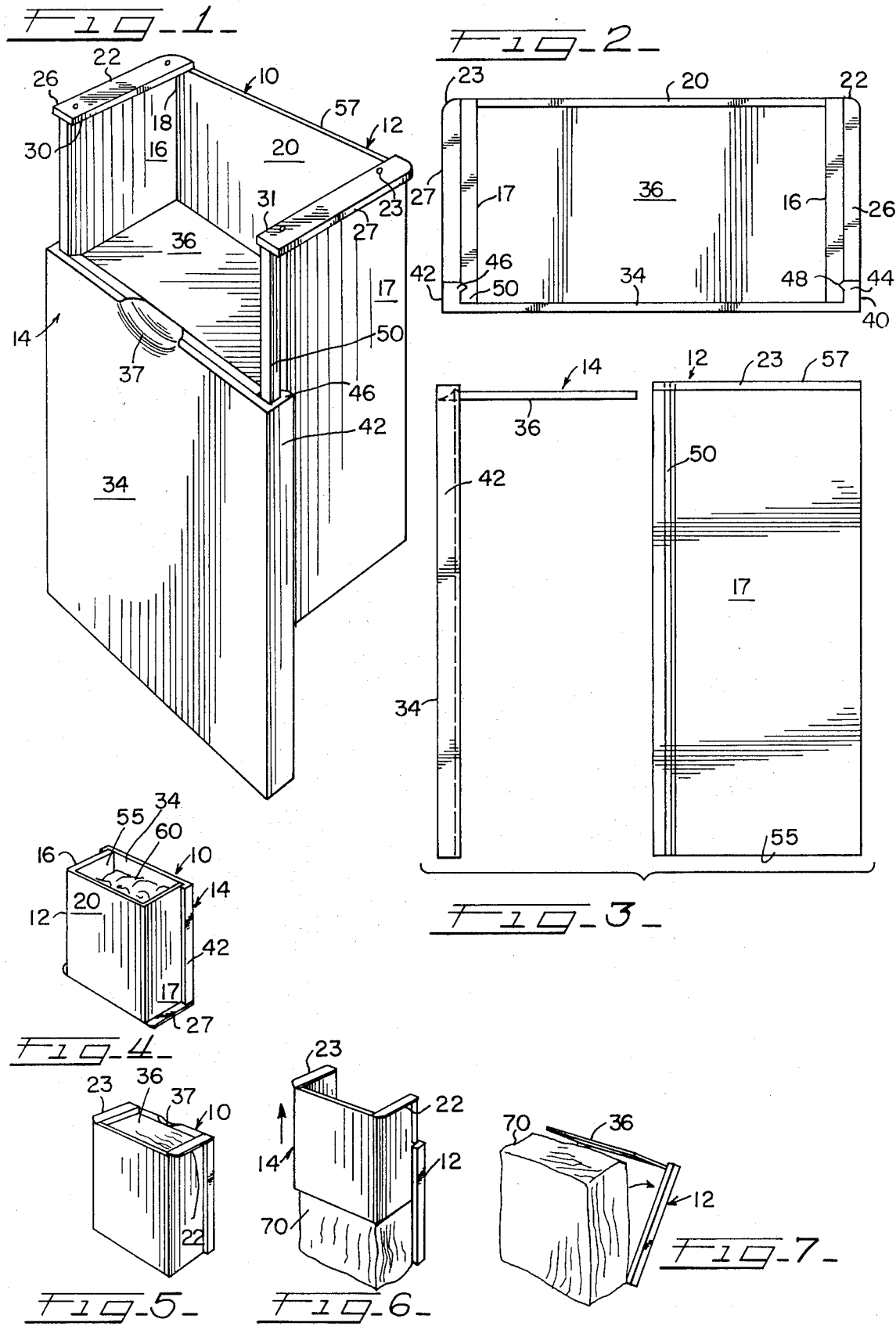

3,816,048

SNOW MOLD

This invention relates to molds for making shaped units of formable material, such as blocks of snow, and the like.

It is an object of the present invention to provide a relatively inexpensive apparatus for making shaped units such as blocks of snow, or other formable material, which units are suitable for incorporation into a wall structure, or the like.

It is another object of the present invention to produce a mold in which the newly formed shape such as a block can be handled and placed in whatever position in the wall structure or the like in which it is to be incorporated, prior to its removal from the mold, and whereby the mold can be separated from the shaped unit while the unit is in the installed position.

It is another object of a preferred embodiment of the present invention to provide a mold structure in which the narrowest dimension of the block can be oriented to provide the thickness of the resulting wall, and the block can be released from the mold after it is set in the exact position in which it is to be incorporated into the wall.

It is another object of a preferred embodiment of the present invention to provide a mold handling and release system in which the length and breadth of the shaped units can conveniently become aligned with the length of the breadth of the wall for most efficient assembly of the wall structure.

It is thus an important object of the present invention to provide a mold structure which obviates the removal of the shaped unit from the mold prior to placement of the unit in position in the wall structure. Such prior removal of the block causes the block either to tend to harden elsewhere, and in view of the outdoor snow conditions in which such shaped units are made, the hardening would otherwise usually take place with the block sitting on snow, with the result that if it must be moved after it is hardened it would have incorporated at the bottom edge thereof some of the snow upon which it has been resting. This results in at least one edge of the block having a very irregular, and hence undesirable shape.

It is another object of the present invention to obviate the need for handling the formed block after it has been removed from the mold. Such handling is undesirable because of the relative weight and weakness of the block tend to cause the block to break up during handling, or at least to have formed therein irregular impressions along the edges of the block which were handled, or upon which the block is borne.

Thus it is also an object of the present invention to provide a mold structure which serves also as a handling, placement and release tool.

These and other objects which will be apparent hereinafter are all achieved in accordance with the present invention which is described hereinafter with the aid of the accompanying drawings in which:

FIG. 1 is a perspective view of the two-piece mold of the present invention;

FIG. 2 is an end view of the mold shown in FIG. 1 as viewed from the bottom of FIG. 1;

FIG. 3 is a side view of the mold shown in FIG. 1, as viewed from the right side of FIG. 1, with the elements of the mold being separated; and FIGS. 4, 5, 6 and 7 are perspective views illustrating the use and operation of a preferred embodiment of the present invention.

In FIG. 1 the mold-handler of the present invention is generally indicated generally by the numeral 10, comprising a first three-sided member indicated generally by the numeral 12 and a second detachable member indicated generally by the numeral 14. Three-sided member 12 includes sides 16 and 17 which are secured along their back edges 18, 19, respectively, to back element 20. Also secured to sides 16 and 17 are transverse flange elements 22, 23, respectively. Flange elements 22, 23 have outer edges 26, 27, respectively which extend substantially outwardly of walls 16, 17, respectively. End flanges 22, 23 also include inner edges 30, 31 which extend a substantial distance inwardly of walls 16, 17, respectively.

Second member 14 comprises a fourth side 34 and an end closure 36, end recess 37, and mating means 40, 42 which extend perpendicularly from the edges of fourth side 34 immediately adjacent to and along sides 16 and 17 respectively. Adjacent the outer extreme of mating means 40, 42 and running along the entire length thereof, are inwardly directed tongues or ribs 44, 46, respectively. Ribs 44, 46 are adapted to mate with grooves 48, 50, respectively which extend along the entire length of side walls 16, 17, adjacent the free edges thereof.

It is noted that when the mold 10 is oriented as shown in FIG. 3 the three-sided member 12 has a generally U-shaped horizontal cross section, whereas the second member 14 has a generally inverted L-shaped vertical cross section.

OPERATION

The two mold elements 12, 14 are shown separated in FIG. 3 and can be mated by inserting end closure 36 of element 14 through open end 55 of element 12, with ribs 46, 44 mating with grooves 48, 50 respectively. Upon partial mating of these elements 12, 14, the relative position of these elements 12, 14, is that which is shown in FIG. 1. Thus as end closure 36 continues to move toward end 57 of three-sided member 12, end closure 36 approaches inwardly extending projection 30, 31 of flange members 22, 23. Finally, the sliding mating movement of elements 12 and 14 is stopped when end closure butts against stop element 30, 31. Upon such complete mating insertion, the mold is assembled and has four sides 16, 17, 20, 34 and bottom 36 and an open end 55.

FIGS. 4–7 illustrate the use of the mold 10. In FIG. 4 the assembled mold 10 is positioned with closed end 57 downward with respect to the other elements, and resting on flange elements 22, 23 with open end 55 facing upwardly. Loose snow 60, or other formable material, is packed through open end 55 into the enclosure formed by the mold until it is filled to a predetermined level, preferably to the very end 55, thereof. When mold 10 is filled with snow, or other shape-forming material, it can be handled, moved and positioned without being removed from mold 10.

FIGS. 5, 6 and 7 illustrate the sequence of steps which is preferably used to position a newly formed block in its desired location, in a wall structure (not shown) for example. The filled mold 10 is inverted as shown in FIG. 5 with the closed end 36 positioned upwardly and open end (not visible) in FIG. 5 extending downwardly. The operator can place a knee (not shown) against recess 37 to prevent upward movement of element 14, and grasp lateral extensions 26, 27 of flanges 22, 23 in his hands, and pull element 14 upwardly along element 12 as shown in FIG. 6. Bottom element 36, being secured to fourth side 34 prevents the newly formed block 70 from moving upwardly with element 14 and, removal of three-sided element 14 from mating engagement with element 12 and block 70 does not disturb the position of block 70. When element 14 is completely separated from block 70, and element 12, element 12 can be moved laterally, from block 70, without disturbing the position of newly formed block 70.

Thus it is apparent that all of the objects set forth herein are achieved by the present invention. The formed units can be positioned, while in the mold, at the place at which they are to be used, and the mold is separated therefrom without disturbing said formed unit, thus obviating the need to handle the formed unit after the mold is separated therefrom.

It will be apparent that many variations and modifications can be made in the illustrated embodiment without departing from the scope of the invention. Thus it is intended that the invention be limited only by the claims appended hereto.

We claim:

1. A mold for producing shaped units of formable material comprising a first and second element, said first element comprising laterally disposed partial enclosure means having two open ends, and one open side, said second element comprising side closure means for said open side of said first element, and end closure means for only one of said open ends, said side closure means and said end closure means being fixed with respect to each other, said side closure means including slidable securing means for mating said second element with said first element with said end closure means traveling through said open end and within said first element during said mating; stop means for limiting the extreme of said traveling to position said end closure means adjacent an end of said first element opposite said open end.

2. The mold of claim 1 wherein said slidable securing means comprises rib means extending along the entire length adjacent both edges of one of said members, and mating grooves extending along the length adjacent edges of the other of said members.

3. The mold of claim 1 wherein said stop means comprises flange means extending transversely across the end of opposing side walls of said first element at the end thereof opposite said open end of said mold, and wherein said flange means extend outwardly of said side walls to provide handle means.

4. A four-sided mold for producing blocks comprising a first and second element, said first element comprising a three-sided enclosure means having two open ends, and one open side, said second element comprising a fourth side of said mold and only one end closure member for closing only one of said open ends, said fourth side and said end closure member being secured with respect to each other, said mold including mating means for slidably securing edges of said fourth side to the sides of said first element adjacent to the open side thereof, said first element including stop means for limiting the mating movement of said second element at one extreme of said movement so that the end closure member is properly positioned as a bottom of said mold.

5. The mold of claim 4 wherein said mating means comprises rib means extending along the entire length adjacent both edges of one of said members, and grooves mating with said rib means, said grooves extending along the length adjacent the edges of the other of said members.

6. The mold of claim 4 wherein said stop means comprises flange means extending transversely across the end of opposing side walls of said first element at the end thereof opposite said open end of said mold, and wherein said flange means extends outwardly of said side walls to provide handle means.

* * * * *